United States Patent Office 3,229,754
Patented Jan. 18, 1966

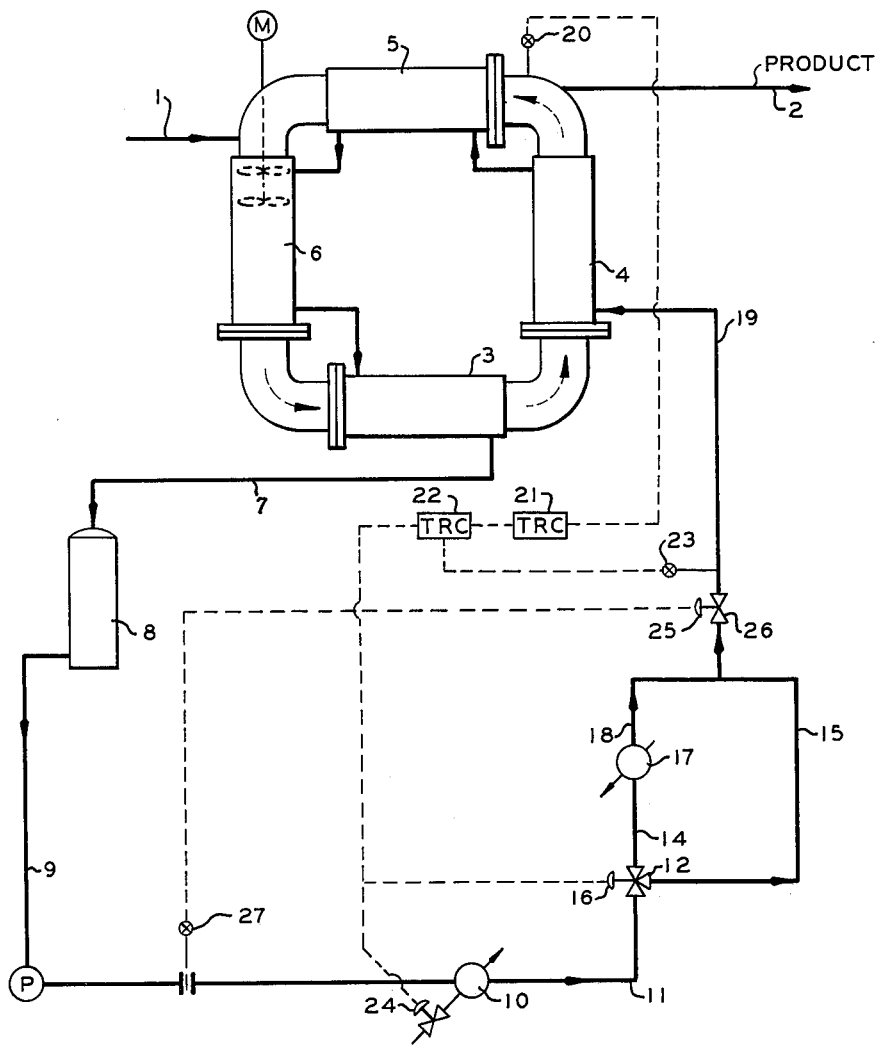

3,229,754
HEATING AND COOLING TEMPERATURE
CONTROL SYSTEM
William F. Hoag, Bartlesville, Okla., assignor to Phillips Petroleum Company, a corporation of Delaware
Filed Mar. 14, 1963, Ser. No. 265,109
1 Claim. (Cl. 165—30)

This invention relates to a process and apparatus for controlling the temperature of fluid streams. In one aspect, this invention relates to temperature control of chemical recations. In another aspect, this invention relates to the temperature control of exothermic polymerization reactions. In still another aspect, this invention relates to the control of the polymerization of olefins in the presence of a solvent and a catalyst at a substantially constant temperature. A further aspect of this invention relates to an improved control system responsive to measured temperatures wherein temperature corrections are obtained rapidly and substantially immediately upon detection of a temperature change.

In the past, attempts to control chemical recations such as the polymerization of olefins have proved difficult as there is a definite tendency for such reactions to accelerate and overheat or decelerate and cool off, as higher temperatures accelerate the reaction and lower temperatures decelerate it. However, in order to maintain the quality of the product and the "rate of yield" constant, it is essential that the temperature of the reaction be maintained substantially constant. Also, since even very minor fluctuations in temperature in the polymerization reaction materially alter the polymer product obtained, it is highly desirable and often necessary to have a control system that makes immediate corrections responsive to detected changes. The present invention is particularly directed to an improved control system having almost immediate response to detected changes in temperature particularly adapted for controlling the temperature of a coolant passed through the polymerization reaction so as to maintain same at a predetermined temperature level.

In accordance with the present invention, I have now discovered an improved process for controlling the temperature of the reactor so as to maintain same at a predetermined temperature by providing means to vary the temperature of the coolant being supplied to the reactor so as to provide the heat exchange medium at any desired value required to maintain the desired temperature constant within the reaction zone. Further, in accordance with this invention, I have provided a control system for maintaining a predetermined temperature within a reaction zone which requires only the minimum amount of refrigeration to be employed. By maintaining the temperature of the heat exchange medium, after start-up, under normal operations slightly above the temperature required, the exact temperature called for for the control system of the reaction zone temperature can be rapidly achieved by altering the temperature of the heat exchange medium by the addition of varying amounts of heat exchange medium cooled below the temperature required in the reaction zone. Since altering the reaction temperature solely by the addition of heat or removal of heat from the heat exchange medium provides a slow system at best for the regulation of the final temperature of the fluid medium as it is introduced in a heat exchange relationship with the reactor, I have found that a rapid control system is provided by compensating for minor variations in the reactor temperature by varying the amounts of cooled and non-cooled heat exchange medium being mixed in the system.

Accordingly, an object of this invention is to provide improved processes for controlling the temperature of chemical reactions and improved systems for carrying out said processes.

Another object of this invention is to provide a control system which utilizes a minimum amount of both heating and cooling while at the same time providing a fine degree of control over the reaction temperature.

Another object of this invention is to provide a process and system for controlling the temperature of an exothermic polymerization reaction.

Another object of this invention is to provide an improved control system that regulates the temperature of a fluid stream responsive to a measured temperature with almost immediate response.

A still further object of this invention is to provide a process and system for controlling the temperature and polymerization of ethylene in a liquid hydrocarbon solvent in which the reaction is exothermic.

A still further object of this invention is to provide a method wherein only a limited number of controls are utilized for controlling the temperature of the coolant introduced into the reaction zone, thereby maintaining the temperature of the reactor constant.

Other objects, aspects and the several advantages of the invention will be apparent to those skilled in the art from the following description taken in conjunction with the accompanying drawing, which is an elevational view of a polymerization reactor embodying the present invention. While this figure shows the invention in a form which may be applied to the polymerization of an olefin feed in a solvent with the aid of a catalyst, it is believed obvious that the present invention also applies to all types of endothermic and exothermic chemical reactions. Furthermore, the present invention is applicable to any heat exchange system wherein a cold stream is blended with a warmer stream in amounts responsive to a measured variable. Thus the blended stream could be a heat exchange fluid passed through a reaction zone, either endothermic or exothermic, a diluent, or any other stream wherein it is desired to maintain a predetermined temperature level and wherein it is desired, or necessary, to obtain a quick or immediate correction of the temperature responsive to the measured temperature of the mixed streams.

Referring now to the drawing, a reactor such as that used for the production of polyethylene has reactant entering the system through line 1 and product removed from the system through line 2. Jackets 3, 4, 5 and 6 are used to control the temperature in the reactor. Coolant is removed from jacket 3 through line 7 and passed into surge 8. Coolant is pumped from surge 8 through line 9, heat exchanger 10, line 11 and through valve 12. The flow of liquid from valve 12 through lines 14 and 15 is controlled by motor 16 on valve 12. The liquid passed through line 14 is cooled in heat exchanger 17 and passed through line 18 wherein it mixes with the bypassed coolant in line 15. The mixed liquid from lines 15 and 18 is passed through line 19 into jacket 4. Temperature transmitter 20 transmits a signal, which can be pneumatic, to TRC 21 indicative of the temperature in the reactor. Temperature recorder controller 21 is constantly receiving a signal related to the temperature in the reactor and is previously set at the temperature at which the reactor is to be maintained. A signal related to the variation of the signal received from the previously set point which represents the amount of variation of the reactor temperature, either above or below that desired, is then transmitted to TRC 22. This resets TRC 22 so that a new temperature in line 19 which will produce the desired temperature in the reactor can be developed.

Temperature transmitter 23 produces a signal related to the current temperature of the fluid in line 19 and communicates this signal to TRC 22. TRC 22 transmits a signal to motor valves 24 and 16 to actuate valves 12 and 24, respectively, that is related to the temperature differential between the set point of TRC 22 and the signal transmitted from transmitter 23. TRC 22 will maintain the temperature in line 19 at whatever temperature it is set. If the temperature in the reactor is above that at which TRC 21 is set, TRC 21 will transmit a signal to TRC 22 which will reset TRC 22 to decrease the temperature in line 19. The change in the signal from transmitter 20 to TRC 21, either above or below the set point of TRC 21, is transmitted to TRC 22 to reset TRC 22 to provide the amount of change required in the temperature of the coolant to the reactor. This change can be achieved by varying the heat input to the coolant, varying the amount of coolant refrigerated in cooler 17, or a combination of both. So long as the temperature of the coolant medium in line 11 is above that required in line 19, the requisite change is obtained by varying the amount of coolant passed through valve 12 and cooler 17. This variation is achieved responsive to the output of TRC 22, which causes valve 12 to adjust to the extent required to obtain sufficient coolant below the temperature of stream 11 to achieve the desired temperature in line 19.

When due to some reason such as an extreme drop in reactor temperature the reactor must have heat added in an amount to increase the temperature above the temperature in line 11, then TRC 22 causes valve 24 on heat exchanger 10 to open so as to allow steam or some other source of heat to flow through same so as to add the necessary heat to the system. As sufficient heat has been thus added and the reactor returns to its more normal predetermined temperature, motor valve 24 will gradually close and motor valve 12 will again serve to regulate the final temperature in line 19 by varying the amount of coolant which is cooled and the amount bypassed around the cooler 17. When the temperature called for in line 19 and available in line 11 become very close, then TRC 22 will cause both valves 24 and 12 to simultaneously adjust so as to add heat to the coolant while also cooling a portion of the heated coolant so as to obtain a fine adjustment of the ultimate temperature in line 19.

Although the invention is not limited to a liquid-phase reaction, an advantageous application thereof is to liquid-phase operation which is a frequently preferred method of conducting polymerization. When polymerization is conducted in the liquid phase, it is often preferred to utilize a catalyst in the form of slurry or suspension in an inert solvent or diluent. The invention is not limited to a particular catalyst or diluent, and any catalyst known for the polymerization of olefins to normally solid polymers can be advantageously employed in the process. Also, it should be understood that the invention is not limited to any particular diluent or solvent for use in the process, and the choice of diluent will depend primarily upon the particular catalyst employed or the type of polymer to be produced.

One suitable method for the preparation of particle form polymer for which the invention is particularly applicable is disclosed in the copending application of Leatherman et al., Serial No. 590,567, filed June 11, 1956. In the following discussion the term "particle form polymer" will be employed to designate a polymer of an olefin formed as a particulate solid in a diluent at the conditions of polymerization.

Another suitable, but non-equivalent, method of producing highly crystalline, high density polymers comprises contacting an olefin such as ethylene, propylene, 1-butene and the like with a catalyst formed by mixing two or more components wherein one component is an organometal compound, including those where one or more but not all organo groups is replaced by a halogen, a metal hydride, or a metal of group I, II or III; and the second component is a group IV to VI metal compound, e.g., salt or alcoholate. A third catalyst component which can be used advantageously is an organic halide or metal halide where the organic radical has thirty or less carbon atoms, and is advantageously an alkyl, cycloalkyl or aryl group. These catalysts are more fully discussed in the patent of W. B. Reynolds et al., Patent No. 2,886,561, issued May 12, 1959, and specific examples of such compounds are disclosed therein. The reaction using these catalysts is preferably carried out in the presence of a hydrocarbon diluent in liquid phase at a temperature in the range from room temperature up to about 300° F. Polymers produced in the presence of these catalysts have molecular weights which can range from 10,000 to 200,000 or higher. They generally have crystallinities of the order of 80 to 85 percent and densities of about 0.950.

A particularly suitable catalyst for the polymerization of propylene to a solid particle form polymer is a two-component catalyst system: (a) a dialkylaluminum halide compound and (b) the reaction product of titanium tetrahalide and aluminum. The dialkylaluminum halide compound can be represented by the formula RR'AlX wherein R and R' are selected from alkyl groups having from 1 to 12, inclusive, carbon atoms and wherein R and R' can be the same or different alkyl groups, and X is a halogen selected from chlorine, bromine, iodine or fluorine, preferably chlorine. Representative examples of suitable alkyl groups include methyl, ethyl, propyl, isobutyl, hexyl, octyl, decyl, dodecyl, and the like. A very suitable dialkylaluminum halide is diethylaluminum chloride. If desired, mixtures of dialkylaluminum halides can be used in the invention.

It is to be noted that the conditions of polymerization depend on the monomer, catalyst and diluent employed. Broadly, the temperature preferred for particle form polymer is in the range of 70° to 250° F.

The term "polymer" includes both homopolymers and copolymers. Particularly preferred polymers are those described in the patent of Hogan et al., U.S. 2,825,721, and the copending applications of Harban et al. and Leatherman et al., supra, incorporated as a part of this disclosure.

The polymerization reaction is carried out in a tubular closed loop reaction zone wtih smooth surfaces, catalyst, liquid diluent and hydrocarbon reactants being continuously moved through said zone at a velocity sufficient to prevent polymer settling and in the highly turbulent flow range, and solid particle form polymer product being withdrawn from the reaction zone.

Movement of the contents of the reaction zone is provided by at least one propeller on a drive shaft, having associated therewith radially spaced straightening vanes projecting perpendicularly from the inner wall of the reactor and positioned adjacent to said propeller.

The polymerization reaction is preferably carried out in a vertically disposed tubular closed loop reactor, said reactor being of uniform cross section and substantially free from obstruction, containing at least one means for providing high velocity movement of the contents of the reactor through said reactor.

Particle form polymer can be prepared from olefin polymers, such as ethylene and propylene, and from mixtures of ethylene and/or propylene with other saturated hydrocarbons, for example mixtures of ethylene with minor amounts of higher 1-olefins such as propylene, 1-butene, 1-pentene, 1-hexene, and the like. Examples of comonomers which can be used with ethylene and/or propylene include 1-olefins having no branching nearer the double bond than the 4-position and conjugated and non-conjugated diolefins, such as 1,3-butadiene, 1,4-pentadiene, 1,5-hexadiene, dicyclopentadiene and the like. The polymerization reaction is carried out in the presence of a liquid hydrocarbon diluent which is inert in the polymerization reaction and in which the polymer is insoluble under reaction conditions. Suitable diluents include paraffins such as those having from 3 to 12 and preferably 3 to 8 carbon atoms per molecule, for example n-butane, n-pentane, isopentane, n-hexane, n-decane, etc., saturated cyclic hydrocarbons such as cyclohexane, cyclopentane and methylcyclopentane, methylcyclohexane, etc. It is also within the scope of the invention to employ as a diluent the monomer being polymerized; for example, propylene is polymerized in liquid propylene. The polymerization reaction temperature will vary depending on the particular liquid diluent employed and on the olefin reactants and catalyst. Usually, however, when using a chromium oxide catalyst, polymerization is carried out at 230° F. and below, preferably between about 225° F. and about 150° F. The olefin reactants are contacted in the polymerization zone with a suspension of the subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.0001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956.

The following example will further illustrate the invention. It is not, however, intended that the invention should be limited to the embodiment shown by the example.

EXAMPLE

Particle form ethylene/butene copolymers were prepared in a tubular closed loop reactor, having controls therein as shown in the drawing. The reactor had an internal diameter of 16 inches and an overall length of 279 feet. One section of the loop reactor was adapted to house the propellers and vanes as illustrated and all four sections were connected by four L's The polymers were prepared in the presence of normal pentane and a catalyst comprising about 2.5 weight percent of chromium as chromium oxide, containing hexavalent chromium with silica-alumina.

The conditions employed in preparing the polymers were as follows:

Table I

Reactor conditions:
  Temperature, ° F. _____ 212
  Pressure, p.s.i.g. _____ 625
  Coolant, temp., ° F. _____ 170

Flow rates:
  Ethylene, lbs./hr. _____ 1000
  Butene-1, lbs./hr. _____ 75
  Catalyst, lbs./hr. _____ 26
  Solvent, g.p.h. _____ 45
  Polymer product, lbs./hr. _____ 1000

In carrying out the polymerization process in the apparatus as shown, a polymerization catalyst, such as chromium oxide containing hexavalent chromium associated with silica-alumina, is slurried in a diluent, such as normal pentane, and introduced to the reactor. Upon entering the reactor the catalyst and diluent are entrained in the swiftly moving contents of the reactor, passing downwardly through the propelling section. It is preferred that the olefin reactants be introduced to the reactor at a point of maximum turbulence in order to provide good contact between this material and the flowing subdivided catalyst. For this reason the olefin can be introduced between propellers which bound a region of high turbulence or downstream of said propellers. As the reactants, catalyst, diluent and also solid particulate polymer reaction product pass from the propelling section, a portion of the turbulence imparted by the propellers is converted to flow energy, thereby providing a high velocity stream leaving this section. In order to maintain the particle form polymer which results from the polymerization reaction in suspension in the flowing reactor contents, it is necessary that the velocity in the reactor be maintained sufficiently high to prevent settling due to gravity and in the highly turbulent flow range. The term "turbulent" as used herein defines the conventional hydraulic sense, namely as defining flow which is non-streamline or non-linear. Ordinarily fluid flow in terms of the conventional Reynolds number $$\frac{Diameter \times velocity \times density}{viscosity}$$

is "linear" or "streamline" at values up to about 1200 and "turbulent" at values above 2200. Between these two values lies a transition region in which the flow may be either streamline or turbulent, depending on factors such as the roughness of the walls bounding the path of flow (see Crane Company Technical Paper No. 409, May 1942). The reactor contents are maintained in a highly turbulent state and above a minimum flow velocity. The relationship between the various factors influencing the rate of settling of solids from a circulating slurry system is extremely complex. The minimum flow velocity as defined herein is that velocity below which the solids settle freely and are not suspended by eddy currents. As the velocity is increased above the minimum, a point is reached when the entire mass of solids is carried in a near-homogeneous flow and there is no concentration gradient from the top to the bottom of the horizontal pipe. This latter is the preferred limiting velocity and is frequently referred to as the standard velocity. Among the more important factors are the volumetric fraction of solids in the slurry, internal pipe diameter, particle diameter and density, as well as density and viscosity of the carrying liquid which will contain some dissolved polymer which influences both factors. It has been found that for the polymerization of olefins, e.g. propylene, in a liquid hydrocarbon diluent, e.g. propylene, in a loop conduit, the following relationships are preferred;

Table II

| Loop conduit internal diameter, inches: | Preferred flow velocity ranges feet per second |
|---|---|
| 5 | 4–15 |
| 10 | 6–20 |
| 15 | 8–25 |
| 20 | 10–30 |
| 25 | 12–35 |
| 30 | 13–40 |
| 40 | 15–45 |

Conversion of the olefin to polymer takes place as the mixture of catalyst, diluent and olefin passes through the reactor loop and back into the original points of introduction of these materials. Periodically or continuously, as desired, reaction product is withdrawn from the reactor through line 2, which may be at any convenient position on said loop conduit. The reaction effluent is subjected to further processing (not shown) for the separation of polymer, catalyst, diluent and unreacted olefin. The reaction temperature is conveniently controlled in accordance with this invention by controlling the temperature of cooling fluid passed through heat exchange sections of the reactor.

In actual operation, controller 21 is set to control the reactor at 212° F., and temperature controller 22 is set for 170±5° F. under normal operating conditions. Transmitter 20 transmits a signal to TRC 21 that is related to the temperature of the reactants in the loop reactor. TRC 21 is set for a predetermined temperature (212° F.) which it is desirable to maintain in the loop reactor. TRC 21 transmits a signal to reset TRC 22 that is related to the difference in the temperature in the loop reactor and that at which TRC 21 is set.

Temperature transmitter 23 transmits a signal to TRC 22 that is related to the temperature in line 19. TRC 22 transmits a signal to motor 16 and motor 24 related to the difference in temperature of the fluid flowing through line 19 and the temperature for which TRC 22 is set.

TRC 22 transmits signals varying from 3 to 15 p.s.i.g. As the signal from TRC 22 increases from 3 to 10 p.s.i.g., motor 16 will turn valve 12 to decrease the flow of fluid from line 11 that flows through line 14 from 100 to zero percent. As the pressure transmitted from TRC 22 increases from 9 to 15 p.s.i.g., the rate of flow of steam passing into heat exchange 10 will increase from zero to the maximum flow rate of steam into heater 10.

On start-up of the loop reactor the temperature in the loop reactor is so low that reaction will not occur. The water passing through line 9 will be of low temperature. Transmitter 20 will transmit a signal that relates to the temperature in the reactor to TRC 21 that is much lower than the signal that relates to the temperature for which TRC 21 is set. TRC 21 will transmit a strong signal to TRC 22 to increase the set point for which TRC 22 is set. TRC 22 will transmit a pressure of about 15 p.s.i.g. to motor 24 which will cause the flow of steam to heater 10 to be at a maximum rate. The pressure on motor 16 will be above 10 p.s.i.g., which will cause valve 12 to be turned so that all liquid passing from line 11 will pass through line 15. Under these conditions the reactants in the loop reactor will increase in temperature as a result of the heat transferred through the jackets and the reaction will begin. As the reaction increases, the exothermic heat of reaction will increase, and the temperature will further rise. As the temperature in the reactor rises, the signal transmitted to TRC 21 will increase. The signal transmitted from TRC 21 to TRC 22 will be decreased, which will result in the set point of TRC 22 being decreased. This will result in the temperature in line 19 becoming closer to the set point temperature of TRC 22. The signal transmitted from TRC 22 will be decreased. When the signal transmitted from TRC 22 is decreased to 10 p.s.i.g., motor 16 will begin to turn valve 12 to route a portion of the liquid from line 11 through line 14 and cooler 17. When the pressure transmitted from TRC 22 decreases from 10 to 9 p.s.i.g., motor 16 will further turn valve 12 to cause more of the liquid to flow from line 11 through line 14 and motor 24 will continue to decrease the flow of steam to heater 10. The flow of steam to heater 10 will be stopped when pressure transmitted from TRC 22 decreases to 9 p.s.i.g. As the reaction in the loop reactor continues to increase and the temperature in the loop reactor becomes more nearly that for which TRC 21 is set, the signal transmitted from TRC 22 will normally vary between 9 and 3 p.s.i.g. The flow of liquid through line 14 will be controlled to maintain the temperature in line 19 that for which TRC 22 is set.

Flow transmitter 27 transmits a signal to motor 25 that is related to the square of the flow through line 11. The signal transmitted by transmitter 27 to motor 25 will regulate the opening and closing of valve 26 to maintain a constant rate of flow of liquid through line 19.

Thus by operating in accordance with this invention there is achieved a control system which utilizes a minimum amount of both heating and cooling while at the same time providing the desired fine degree of control over the reaction taking place.

It will be apparent to those skilled in the art that various modifications of the invention can be made upon study of the accompanying disclosure. Such modifications are believed to be clearly within the spirit and scope of the invention.

I claim:

A temperature control system to maintain a reactor at a constant and predetermined temperature level which comprises, in combination, a reactor, heat exchange means having a circulating heat exchange medium therein in association with said reactor, first temperature sensing means to detect and produce a first signal representative of the temperature in said reactor, means for transferring said first signal, first temperature recording means to compare said first signal with a second signal representative of the desired predetermined temperature level and produce a third signal, a second temperature recording means, means responsive to said third signal for resetting said second temperature recording means, second temperature sensing means to detect and produce a fourth signal representative of the temperature of said heat exchange medium at a point just prior to introduction of same into said heat exchange means, means to communicate said fourth signal to said second temperature recording means, said second temperature recording means being further provided so as to produce a fifth signal representative of the necessary change in the temperature of said heat exchange medium to provide the predetermined temperature level, a heater through which said stream flows, first valve means responsive to said fifth signal being so adapted as to control the amount of heat added to said heater, the amount of heat added being sufficient to raise the temperature of said stream to a temperature above said desired predetermined temperature level, a second valve means positioned downstream of said heater adapted to divide said resulting heated stream into a first part and a second part, a cooling means to cool said first part, means for bypassing said second part around said cooling means, means for mixing said first part, after cooling with said second part, and means responsive to said fifth signal to actuate said second valve to maintain the predetermined temperature level in said reactor.

References Cited by the Examiner
UNITED STATES PATENTS

| | | | |
|---|---|---|---|
| 2,788,264 | 4/1957 | Bremer et al. | 165—27 X |
| 2,915,298 | 12/1959 | Hamlin et al. | 165—27 |

JAMES W. WESTHAVER, *Primary Examiner.*

FREDERICK L. MATTESON, Jr., *Examiner.*